May 19, 1959 F. GASCHE 2,887,293
VALVE
Filed Sept. 22, 1958
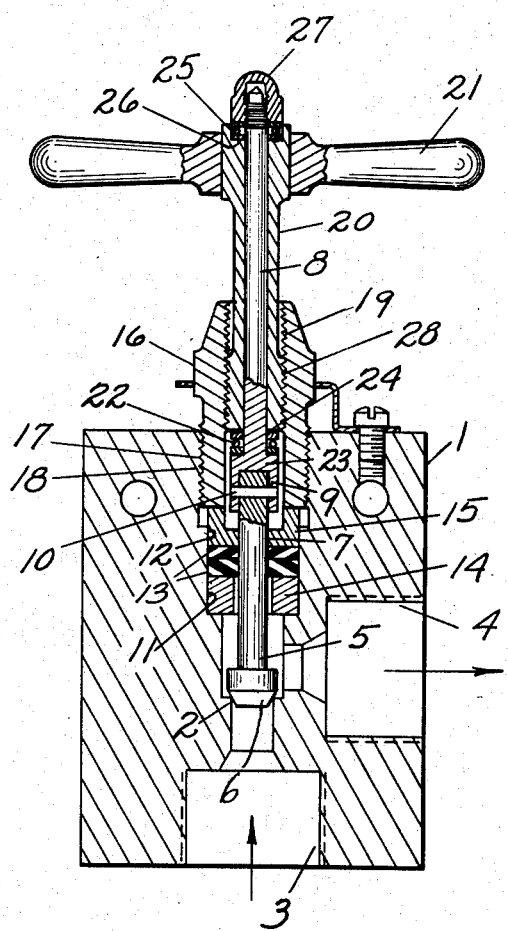
INVENTOR.
Fred Gasche
BY Ralph Hammar
attorney

United States Patent Office 2,887,293
Patented May 19, 1959

2,887,293

VALVE

Fred Gasche, Erie, Pa., assignor to Autoclave Engineers, Inc., Erie, Pa., a corporation of Pennsylvania Application September 22, 1958, Serial No. 762,515

2 Claims. (Cl. 251—88)

This invention is a valve having a non-rotatable valve stem which is accurately aligned with the valve seat and which has no backlash which would make difficult use of the valve for precise regulation of flow. If backlash is present, the position of the handle will not accurately indicate the position of the valve with respect to its seat. The design has the further advantage that the inner or operating part of the valve stem may be made of a material suited to the medium being controlled while the outer part of the valve stem which is sealed from the medium may be made of a different material. The operating part of the valve stem may be made of the same material as the valve body.

In the drawing, the single figure is a sectional view of a valve.

The valve has a body 1 with a seat 2 between an inlet 3 and an outlet 4. The flow through the seat is controlled by a valve stem 5 coaxial with the seat. The taper of the tip 6 of the valve stem will vary with the fineness of the regulation of flow.

The valve stem is made in two parts, an inner part 7 carrying the larger diameter tip 6 which comes in contact with the flow and is of a material suited to the medium, e.g. of the same material as the valve body, and an outer part or shank 8 which does not come in contact with the medium and accordingly can be made of a different material. The outer end of the inner part 7 telescopes into a recess 9 at the inner end of the part 8 and is solidly secured therein by a pin 10. When the inner and outer parts of the stem are thus secured, they function as though made from a single piece of metal. The two-piece construction permits renewal of the inner part of the stem, should it be damaged by errosion or corrosion. The larger diameter tip permits large area port openings in the valve without increasing the stem friction. This is important in valves for high pressures, e.g. 10,000 lbs./square inch.

Surrounding the valve stem is a coaxial recess 11 having a reduced diameter portion 12 surrounding the inner part 7 of the stem and receiving packing rings 13 which are compressed between thrust washers 14 and 15 by an annular packing nut 16 having external threads 17 screwed into the larger diameter section 18 of the recess 11. The packing nut 16 has internal threads 19 into which is screwed a sleeve 20 having a handle 21 fixed to its outer end. The shank 8 is rotatable in the sleeve 20. There is a thrust bearing 22 between a shoulder 23 on the shank and the inner end 24 of the sleeve 20 and there is another thrust bearing 25 between a shoulder 26 on the outer end of the sleeve and a nut 27 which is tightened to take up all backlash or end play between the shank 8 and the sleeve 20. The sleeve 20 provides an extended bearing surface which maintains the alignment of the shank with the valve seat.

The sleeve 20 has external threads 28 which screw in and out of internal threads 19 in the packing nut 16 as the handle is turned to open and close the valve. Because there is no backlash or end play between the handle and the valve stem or between the parts 7 and 8 of the valve stem, the position of the handle corresponds accurately to the position of the tip 6 of the valve stem with respect to the seat 2 which is essential if the valve is to be used for precise regulation of the flow. It will be noted that concentricity of the valve stem with respect to the valve seat and packing is maintained because all of the parts are concentric with the valve seat. The advantages of a freely rotatable valve stem are obtained without sacrificing the precise relation between the position of the handle and the separation of the tip 6 from the valve seat heretofore obtainable only with solid or one-piece valve stems. The valve handles like a one-piece stem so far as its regulating function is concerned but is much easier to operate than a one-piece stem, because the stem is free to rotate in the packing as it moves axially toward and away from the valve seat. Until the tip 6 contacts the seat 2, the stem is free to rotate or to move axially or both, depending upon the friction between the stem and the packing 13 and bearings 22, 25. As soon as the tip contacts the seat, rotation of the stem stops and any further movement of the stem to close the valve is wholly axial.

When the valve is used to control media having a pronounced erosive action, the initial separation of the tip 6 from the valve seat should be fast to minimize the erosion of the mating surfaces of the tip and seat. If there were backlash or end play in the valve stem, the operator could not judge the position of tip accurately enough to prevent the destructive erosion. In the present construction, there is no backlash between the handle and valve stem and if any backlash should develop due to wear, it can be taken out by adjustment of the nut 27.

What is claimed as new is:

1. A valve comprising a valve body having a seat therein between inlet and outlet ways and a recess extending axially away from the seat, said recess having internal threads remote from the seat, a valve stem of material suited to the properties of the medium being controlled by the valve and having a point on its inner end cooperating with the seat, packing in the section of the recess surrounding the part of the stem adjacent the point, the outer end of the stem extending through the packing into a space sealed from the medium controlled by the valve, a shank having a recess solidly receiving and non-rotatably anchored to the outer end of the stem whereby the shank and stem are held in axial alignment, an annular packing nut surrounding and spaced from the shank and having external threads screwed into the recess in the valve body for tightening the packing against the stem and said packing nut having internal threads opposite the shank, a sleeve screwed into the packing nut and rotatably surrounding the shank, a pair of thrust surfaces on the shank respectively spaced from opposite ends of the sleeve, a thrust bearing between each thrust surface and the adjacent end of the sleeve, one of the surfaces being adjustable toward and away from the adjacent end of the sleeve to take up backlash between the shank and sleeve, and a handle fixed to the sleeve for turning the sleeve to move the stem and shank axially as a unit toward and away from the seat as the handle is turned to screw the sleeve into and out of the packing nut.

2. A valve comprising a valve body having a seat therein between inlet and outlet ways and a recess extending axially away from the seat, said recess having internal threads remote from the seat, a valve stem having an inner part made of material suited to the properties of the medium being controlled and an outer part or shank, the inner part of the valve stem having a point on its inner end cooperating with the seat, packing in the recess surrounding the inner part of the stem adjacent the point with the outer part of the stem extending beyond the packing and sealed from the medium being controlled, an annular packing nut surrounding and spaced from the outer part of the stem and having external threads screwed into the recess in the valve body and tightening the packing against the stem, said nut having internal threads opposite the outer part of the stem, a sleeve screwed into the internal threads in the packing nut and rotatably surrounding the outer part of the stem, a pair of thrust surfaces on the outer part of the stem respectively spaced from opposite ends of the sleeve, a thrust bearing between each thrust surface and the adjacent end of the sleeve, one of the surfaces being adjustable toward and away from the adjacent end of the sleeve to take up backlash between the outer part of the stem and sleeve, a handle fixed to the sleeve for turning the sleeve to move the stem axially toward and away from the seat as the handle is turned to screw the sleeve into and out of the packing nut.

No references cited.